United States Patent

Talcott et al.

[11] Patent Number: 5,857,098
[45] Date of Patent: Jan. 5, 1999

[54] BRANCH INSTRUCTION PREDICTION APPARATUS

[75] Inventors: Adam R. Talcott; Ramesh K. Panwar, both of Santa Clara, Calif.

[73] Assignee: Samsung Electronics Co., Ltd., Suwon, Rep. of Korea

[21] Appl. No.: 881,798

[22] Filed: Jun. 24, 1997

[51] Int. Cl.[6] .................................................. G06F 9/38
[52] U.S. Cl. ............................................................ 395/587
[58] Field of Search ..................................... 395/586, 587

[56] References Cited

U.S. PATENT DOCUMENTS

| | | | |
|---|---|---|---|
| 5,367,703 | 11/1994 | Levitan | 395/587 |
| 5,423,011 | 6/1995 | Blaner et al. | 395/587 |
| 5,434,985 | 7/1995 | Emma et al. | 395/587 |
| 5,584,001 | 12/1996 | Hoyt et al. | 395/585 |
| 5,623,614 | 4/1997 | Van Dyke et al. | 395/587 |
| 5,742,805 | 4/1998 | Kulkarni et al. | 395/586 |
| 5,758,143 | 5/1998 | Levitan | 395/587 |
| 5,774,710 | 6/1998 | Chung | 395/585 |

*Primary Examiner*—William M. Treat
*Attorney, Agent, or Firm*—Jones & Volentine, L.L.P.

[57] ABSTRACT

The outcome of a given branch instruction is predicted using early and late branch history addressing modes. In an early addressing process, a first subset of bits from a branch history register is used to first address a branch history table to obtain a plurality of candidate predictions. In a late addressing process, a second subset of bits from the branch history register is used to again address the branch history table to select one of the plurality of candidate predictions, the second subset of bits including additional branch history information loaded into the branch history register subsequent to the early addressing mode. In this way, more recent branch history information is used to predict the outcome of the given branch instruction.

15 Claims, 5 Drawing Sheets

BRANCH INSTRUCTION PREDICTION APPARATUS

BACKGROUND OF THE INVENTION

1. Field of the Invention

The present invention generally relates to processor architectures, and more particularly, the present invention relates to an apparatus for predicting outcomes of branch instructions prior to execution by a processor.

2. Description of the Related Art

Branch instructions include the subset of conditional goto-type commands contained among a processor's instruction set. Typically, multiple instructions are executed by loading selected instructions in an instruction cache or register, and by incrementing a program counter which addresses each of the loaded instructions in order. A branch instruction is a conditional instruction that changes the sequence otherwise dictated by the computer program by specifying a new address at which a new sequence is to begin. An executed branch instruction is said to be "taken" where the associated condition (e.g.,flag "a" is set) is satisfied, resulting in program execution deviating from an instruction contained at a next address to the instruction contained at the address specified by the branch instruction.

Branch prediction refers to a technique in which the outcome of a branch instruction is predicted in advance of actual execution of the instruction. A successful prediction allows for an early loading of the instruction or instructions to be executed immediately after the branch instruction. In fact, in some architectures, the predicted instruction or instructions are speculatively executed in anticipation of the branch result behaving as predicted.

All branch predictions schemes take advantage of the fact that most branches do not behave randomly. Perhaps the simplest technique is so-called "bimodal" branch prediction which distinguishes branches that are typically taken from those that are not. The usual implementation of this approach includes a counter which is incremented when a branch is taken, and decremented when the branch is not taken. Any branch that is repeatedly taken will be predicted as taken, even in the presence of an isolated not-taken event. Likewise, any branch that is repeatedly not taken is predicted as not-taken.

Prediction accuracy may be further improved by a technique known as "local" branch prediction. Local branch prediction schemes attempt to identify repetitive patterns of a branch instruction. Repetitive patterns are particularly a characteristic of loop control branch instructions. These instructions, when taken, direct the program to a previously executed instruction in the program sequence to thus form an instruction loop in which a sequence of instructions is repeated. Eventually the program encounters the same loop control branch instruction, and if again taken, the loop is repeated. A repetitive pattern in the branch instruction results when the loop is repeated the same number of times during each pass. For example, if the loop is repeated four times during each pass, then the loop control branch instruction will exhibit a repetitive pattern of 111011101110 . . . , where 1 is "taken" and 0 is "not taken". Local branch prediction is commonly implemented by way of a history table that stores the history of the branch instruction and a counter that records the current behavior of the branch instruction.

Local branch prediction considers the pattern or pattern of a given branch only. A further refined technique, known as "global branch prediction", considers the behavior of branches other than the current branch for which a prediction is being made. That is, in some cases, the behavior of two or more branches will correlate to some degree. By taking note of the actions of previously executed branches, the behavior of a current branch is predicted.

Global branch prediction is typically implemented as shown in FIG. 1. A shift register 102 records the actions of the most recent h conditional branches. For example, a "1" bit may denote a branch "taken" and a "0" bit may denote a branch "not taken". The resolved branch outcomes of the shift register 102 are actually predicted branch outcomes in the sense that the outcomes are loaded into the shift register as they are predicted. As illustrated by the arrow in FIG. 1, the most significant bit (msb) of the shift register denotes the hth most recent branch behavior, while the least significant bit denotes the most recent branch behavior.

The contents of the bit register 102 are combined with the branch address of the current branch for which a prediction is being executed, with the combined data forming a table address of a branch prediction table 104. The branch history table 104 contains previously generated branch history information. A "predict taken" or a "predict not taken" is output from the branch history table as addressed by the table address obtained from the branch address and the bit register 102 output.

With respect to global branch history based prediction schemes, studies have shown that significant amounts of global branch history are required to obtain low branch misprediction ratios. However, the branch history table size doubles with each additional bit of branch history, and thus, these schemes require large branch prediction tables to achieve high levels of performance. The large size of the tables results in the expenditure of multiple cycles to read the table entries. This in turn requires older branch execution information be used to predict the outcome of a given branch instruction in order to avoid stalling the instruction pipeline in favor of the prediction process. This is explained below with reference to FIG. 2.

Suppose, for example, that the branch history register contains h bits. As mentioned above, these h bits, together with the address of the given branch for which a prediction is desired, form the BPT address used to access the branch prediction table. However, in the time it takes to address the table, multiple branches may have already been executed or resolved. In this case, it is not possible to wait until the branch outcome of the branch immediately preceding the given branch is obtained (and the result applied to the branch history register) before accessing the branch prediction table. This is because the given branch will have executed long before the prediction is completed. In other words, reading of branch prediction table for the given branch will have started while the read for the previous branch or branches has not yet been completed. For this reason, as shown in the bottom half of FIG. 2, older branch information is used. That is, suppose that H branches are resolved in the time it take to address the branch prediction table in connection with a given branch. This means that the address of the given branch must be combined (at time $t_{ADDR}$) with the contents of the register well in advance of actual execution of the given branch to obtain a sufficiently early prediction result (at time $t_{PREDICT}$). This in turn prevents usage of the most recent H branch outcomes in the prediction process. As branch outcome correlations are often greatest amongst neighboring branches, the prediction performance suffers as a result of the inability to use the most recent branch outcomes in the branch prediction.

SUMMARY OF THE INVENTION

It is therefore an object of the present invention to overcome one or more of the drawbacks of the traditional branch history prediction techniques mentioned above.

It is a further object of the present invention to allow for the use of more recent branch outcomes in the prediction of the outcome of a given branch instruction.

According to one aspect of the present invention, a branch prediction apparatus for predicting an outcome of a given branch instruction, includes: a branch history register which stores branch instructions outcomes; a branch history table which stores branch predictions; a first decoder which receives a first subset of bits from said branch history register to first address said branch history table to obtain a plurality of candidate predictions; and a second decoder which receives a second subset of bits from said branch history register to again address said branch history table to select one of the plurality of candidate predictions, wherein the second subset of bits includes additional branch instruction outcomes loaded into said branch history register subsequent to said first decoder receiving the first subset of bits.

According to another aspect of the invention, a branch address of the given branch instruction is combined with at least one of the first subset of bits to identify one of a row address or a column address of the branch history table, and the second subset of bits to identify the other of a row address or a column address of the branch history table.

According to yet another aspect of the invention, upper bits of a branch address of an earlier branch instruction which precedes the given branch instruction are combined with the first subset of bits to address, via said first decoder, one of a row address or a column address of the branch history table, and wherein lower bits of the branch address of the given branch instruction are combined with the second subset of bits to address, via said second decoder, the other of a row address or a column address of the branch history table.

According to still another aspect of the invention, said branch history table is a RAM structure, and said first decoder is a row decoder of said RAM structure, and wherein said second decoder is a column decoder of said RAM structure.

According to another aspect of the invention, a size of said branch history register is at least g–r bits, where g and r are positive integers and g is greater than r, and wherein the first subset of bits includes bits stored at the (g–r–1)th through the (m–r)th positions of said branch history register, and the second subset of bits includes the bits stored at the (m–1)th through $0^{th}$ positions of said branch history register, where m is a positive integer which is less than g and more than r.

BRIEF DESCRIPTION OF THE DRAWINGS

The above and other objects and advantages of the present invention will become apparent from the description that follows, with reference to the accompanying drawings, in which.

DETAILED DESCRIPTION OF THE PREFERRED EMBODIMENTS

Like other RAM structures, an entry in a branch prediction table is selected using row and column address decoders which operate one after the other. In the case where the row address precedes the column address, the row address may be considered an "early" address, while the column address may be thought of as a "late" address. Note here that the column address is used to select from among the several entries read out of the RAM from the row decode process.

The present invention leverages this early and late addressing of the RAM such that more recent branch history information is included when indexing into the branch prediction table than would normally be used in the conventional schemes utilizing a multiple-cycle branch prediction table.

Figure 1:
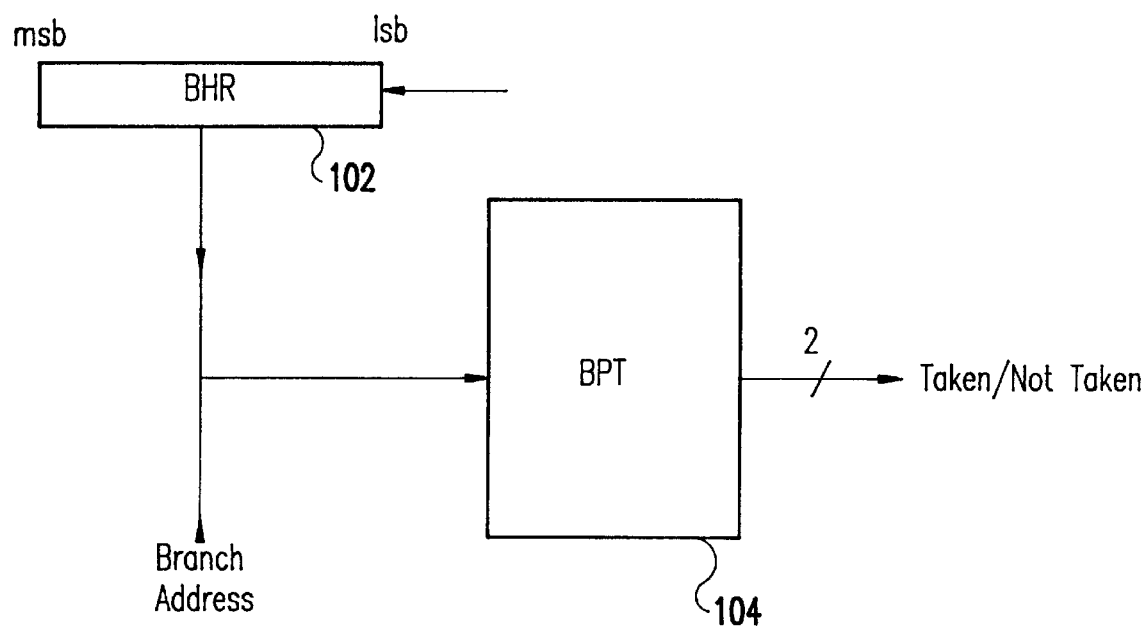
FIG. 1 is a block diagram of a conventional global branch prediction apparatus.
Figure 2:
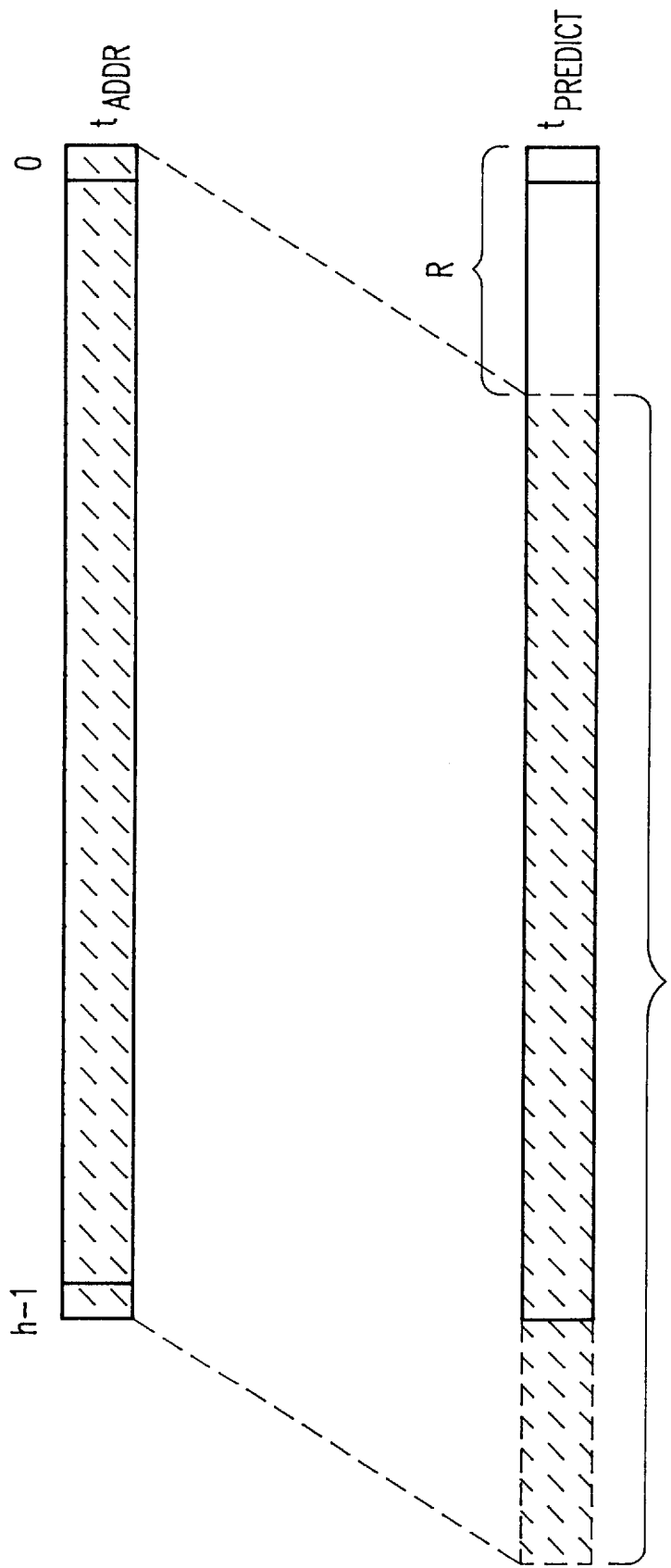
FIG. 2 is a diagram showing the contents of a register in the branch prediction apparatus of FIG. 1.
Figure 3:
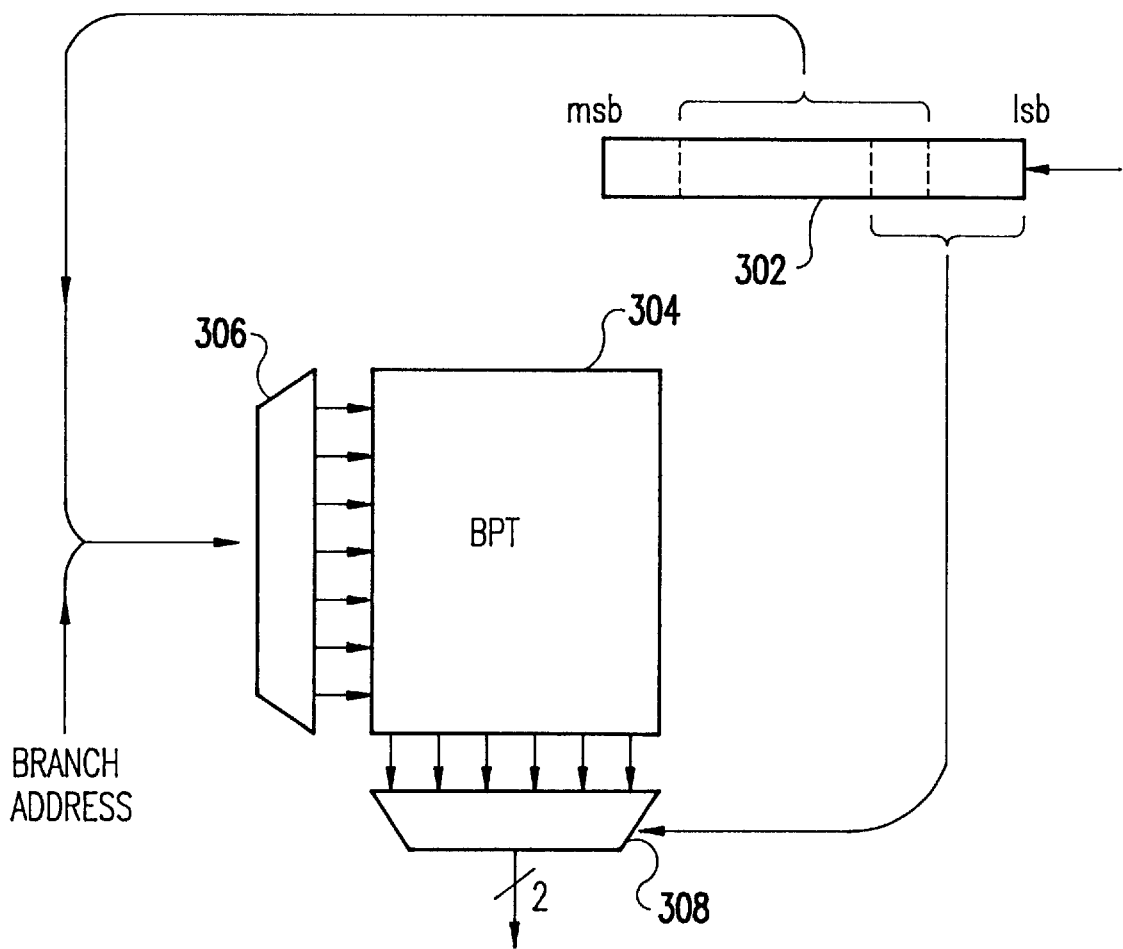
FIG. 3 is a block diagram showing an exemplary global branch prediction apparatus of the present invention.

FIG. 3 is a block diagram of an exemplary implementation of the present invention. A branch prediction table 304 is accessed by a row decoder 306 and a column decoder 308. The row decoder 306 selects a row of the branch prediction table 304, while the column decoder 308 selects one of the entries contained in the selected row. A shift register 302 records the actions (or the predicted actions) of the most recent g conditional and unconditional branches. For example, a "1" bit may denote a branch "taken" and a "0" bit may denote a branch "not taken". As illustrated by the arrow in FIG. 3, the most significant bit (msb) of the shift register denotes the gth most recent branch behavior, while the least significant bit denotes the most recent branch behavior.

Twice for each branch prediction, contents of the shift register 102 are extracted and applied as addresses to the branch prediction table 304. The first addressing is called "early addressing" herein, while the second addressing is referred to as "late addressing". In the early addressing mode, selected contents of the shift register 102 are combined with the branch address of the branch for which the prediction is needed, and the combined data are applied to the row decoder 306 as the row address of the branch prediction table 304. In the late addressing mode, after updating the shift register 102 with additional branch outcomes, selected contents of the shift register 102 are applied to the column decoder 308 as the column address of the branch prediction table 304. A "predict taken" or a "predict not taken" is then output from the branch history table 304 via the column decoder 308.

As mentioned above, in the embodiment of FIG. 3, the branch address is combined with branch outcomes (g–r–1) through (m–r) to address the branch history table 304 in the early addressing mode. One alternative to this would be to instead combine the branch address with the branch outcomes (m–1) through 0 as the column address of the branch prediction table 304. Yet another alternative would be to apply all or part of the branch address to both the outcomes (g–r–1) through (m–r) and the branch outcomes (m–1) through 0.

Still another and more preferred alternative is to combine the upper bits of an early branch address with branch outcomes (g–r–1) through (m–r) as the row address of the branch history table 304 in the early addressing mode, and to then combine the remaining lower bits of a later branch address (for which the prediction is being made) with the branch outcomes (m–1) through 0 as the column address of the branch prediction table 304. The later branch address would be available one or more cycles after the early branch address. This scheme takes advantage of the fact that, since the memory addresses of a sequence of instructions are likely to be close to one another, the upper bits of the branch addresses are less subject to change from one instruction to the next than are the lower bits of the branch addresses.

Figure 4:
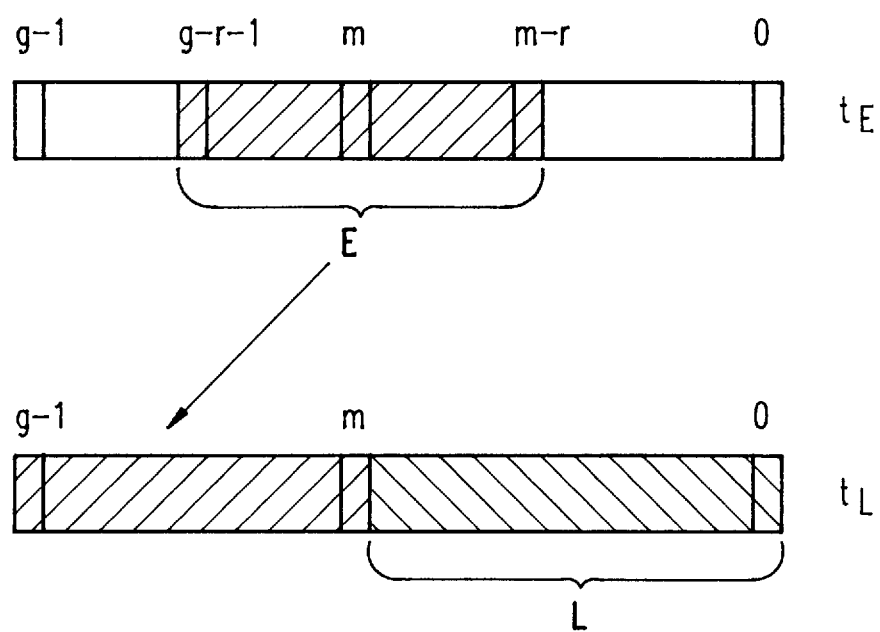
FIG. 4 is a diagram showing the contents of a register in the branch prediction apparatus of FIG. 3.

Reference it now made to FIG. 4 for a description of the contents output from the shift register 302 in the early and late addressing modes. Again, the branch history register 302 contains the branch outcomes of g previous branches. In an early addressing mode at time $t_E$, branch outcomes (g–r–1) through (m–r) inclusive are applied, together with the branch address, to the row decoder 306 as the row address of the branch prediction table 304. Here, r is the number of branches that are expected to be resolved between the early and late addressing, and m is an arbitrary integer dependent on the number of rows and columns contained in the branch history table 304. In the late addressing mode at time $t_L$, branch outcomes (m–1) through 0 are applied to the column decoder 308 as the column address of the branch prediction table 304.

As shown in FIG. 4, at the time $t_L$ of late addressing, the bits E of the early addressing have shifted to the left by r bits. By the use of early and late addressing, these bits E are effectively combined with the later bits L to address the branch history table 304 in two stages. When compared to the conventional scheme, an additional r most recent outcomes are utilized in the prediction, thus improving the prediction performance.

Figure 5:
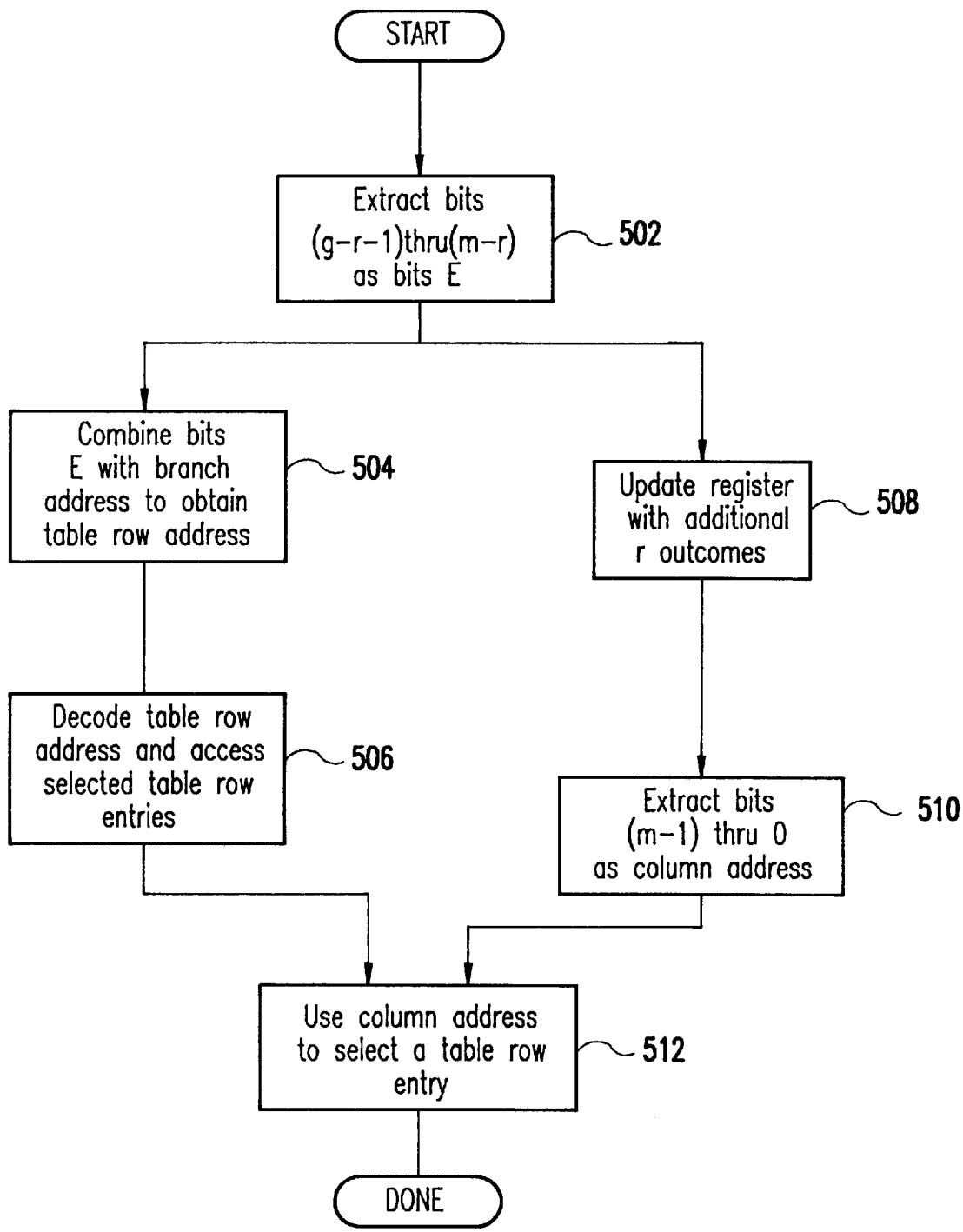
FIG. 5 is an exemplary operational flowchart of the present invention.

FIG. 5 is a flowchart depicting the operation of an example of the present invention. In a first step 502, bits (g–r–1) through (m–r) are extracted as bits E from the branch history register. r is the number of branches that are expected to be resolved between the early and late addressing of the branch history table. It is noted that r may vary from branch to branch and in some instances r can be zero. In a preferred embodiment, r is set as a constant of 0 or more, and more typically, r is set as a constant of 0 or more. g is the number of bit positions of the branch history register (in the case where r is allowed to be 0 for some predictions), and m is an arbitrary number, and each are dictated primarily by the size of the branch history table. That is, (g–m) bits of data are needed (together with the branch address) to address the row decoder, and m bits of data are needed to address the column decoder in the described embodiment. Also, one additional advantage of the invention resides in the fact that where r≧0, the size of the branch history register is reduced to g–r bits.

Steps 504 and 506 constitute the early addressing of the invention. That is, at step 504, the bits E are combined with the branch address of the given branch instruction for which a prediction is needed. The combined data forms a row address of the branch history table. At step 506, the row address is decoded and the entries of the selected table row are accessed.

In the meantime, during the early addressing, the branch history register is updated with an additional r outcomes at step 508. Then, at step 510, bits (m–1) through 0 are extracted from the register as a column address. And finally, at step 512, the column address is used to select one of the row entries of the branch history table as access in step 506. As should be apparent, step 510 and 512 constitute the late addressing of the invention.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A branch prediction apparatus for predicting an outcome of a given branch instruction, comprising:
    a branch history register which stores outcomes of plural branch instructions;
    a branch history table which stores branch predictions;
    a first decoder which receives a first subset of bits from said branch history register to first address said branch history table to obtain a plurality of candidate predictions; and,
    a second decoder which receives a second subset of bits from said branch history register to select one of the plurality of candidate predictions, wherein the second subset of bits includes additional branch instruction outcomes loaded into said branch history register subsequent to said first decoder receiving the first subset of bits.

2. An apparatus as claimed in claim 1, wherein a branch address of the given branch instruction is combined with at least one of the first subset of bits to identify one of a row address or a column address of the branch history table, and the second subset of bits to identify the other of a row address or a column address of the branch history table.

3. An apparatus as claimed in claim 1, wherein upper bits of a branch address of an earlier branch instruction which precedes the given branch instruction are combined with the first subset of bits to address, via said first decoder, one of a row address or a column address of the branch history table, and wherein lower bits of the branch address of the given branch instruction are combined with the second subset of bits to address, via said second decoder, the other of a row address or a column address of the branch history table.

4. An apparatus as claimed in claim 1, wherein said branch history table is a RAM structure, wherein said first decoder is a row decoder of said RAM structure, and wherein said second decoder is a column decoder of said RAM structure.

5. An apparatus as claimed in claim 2, wherein said branch history table is a RAM structure, wherein said first decoder is a row decoder of said RAM structure, and wherein said second decoder is a column decoder of said RAM structure.

6. An apparatus as claimed in claim 3, wherein said branch history table is a RAM structure, wherein said first decoder is a row decoder of said RAM structure, and wherein said second decoder is a column decoder of said RAM structure.

7. An apparatus as claimed in claim 1, wherein a size of said branch history register is at least g–r bits, where g and r are positive integers and g is greater than r, and wherein the first subset of bits includes bits stored at the (g–r–1)th through the (m–r)th positions of said branch history register, and the second subset of bits includes the bits stored at the (m–1)th through $0^{th}$ positions of said branch history register, where m is a positive integer which is less than g and more than r.

8. An apparatus as claimed in claim 2, wherein a size of said branch history register is at least g–r bits, where g and r are positive integers and g is greater than r, and wherein the first subset of bits includes bits stored at the (g−r−1)th through the (m−r)th positions of said branch history register, and the second subset of bits includes the bits stored at the (m−1)th through $0^{th}$ positions of said branch history register, where m is a positive integer which is less than g and more than r.

9. An apparatus as claimed in claim 3, wherein a size of said branch history register is at least g−r bits, where g and r are positive integers and g is greater than r, and wherein the first subset of bits includes bits stored at the (g−r−1)th through the (m−r)th positions of said branch history register, and the second subset of bits includes the bits stored at the (m−1)th through $0^{th}$ positions of said branch history register, where m is a positive integer which is less than g and more than r.

10. An apparatus as claimed in claim 7, wherein r is at least 1.

11. An apparatus as claimed in claim 8, wherein r is at least 1.

12. An apparatus as claimed in claim 9, wherein r is at least 1.

13. An apparatus as claimed in claim 7, wherein r is at least 0.

14. An apparatus as claimed in claim 8, wherein r is at least 0.

15. An apparatus as claimed in claim 7, wherein r is at least 0.

* * * * *